United States Patent [19]

Sibley

[11] 4,158,295
[45] Jun. 19, 1979

[54] SPRAY GENERATORS FOR ABSORPTION REFRIGERATION SYSTEMS

[75] Inventor: Howard W. Sibley, Baldwinsville, N.Y.

[73] Assignee: Carrier Corporation, Syracuse, N.Y.

[21] Appl. No.: 867,554

[22] Filed: Jan. 6, 1978

[51] Int. Cl.² ............... F25B 15/00; F25B 33/00; F22B 1/02
[52] U.S. Cl. .................. 62/476; 62/148; 62/497; 122/32
[58] Field of Search ............. 62/148, 476, 497; 122/235 K, 235 C, 32

[56] References Cited

U.S. PATENT DOCUMENTS

| | | | |
|---|---|---|---|
| 418,939 | 1/1890 | Bradford | 122/32 |
| 1,666,426 | 4/1928 | Ruths | 122/32 |
| 3,276,217 | 10/1966 | Bourne et al. | 62/476 |

Primary Examiner—Lloyd L. King
Attorney, Agent, or Firm—J. Raymond Curtin; Donald F. Daley; John S. Sensny

[57] ABSTRACT

A spray generator for an absorption refrigeration system that includes a heat exchanger comprised of a multiplicity of variably spaced heat exchange tubes. The tubes are spaced close together near the top of the heat exchanger and spaced more widely apart near the bottom of the heat exchanger. Dilute absorbent solution is sprayed down through the heat exchanger. The close nesting of the tubes in the top portion of the heat exchanger retards liquid flow and aids heating of the solution. The wide spacing of the tubes in the lower section of the heat exchanger facilitate vapor flow out of the heat exchanger and eliminates liquid "blow-off". The top tubes are covered by a baffle to prevent the liquid solution from splashing out of the heat exchanger off of these top tubes.

8 Claims, 2 Drawing Figures

SPRAY GENERATORS FOR ABSORPTION REFRIGERATION SYSTEMS

The government has rights to this invention pursuant to contract No. 14-03-628ON awarded by The Department of Energy.

BACKGROUND OF THE INVENTION

This invention relates, generally, to absorption refrigeration, and more specifically to improved apparatus for generating a concentrated absorbent fluid.

Generally, an absorption refrigeration system includes a low pressure side having an evaporator and an absorber and a high pressure side having a generator and a condenser, and uses an absorbent fluid (usually lithium bromide) and a refrigerant fluid (usually water). Absorbent fluid is located in the absorber, refrigerant fluid is located in the evaporator, and the absorber and evaporator are connected together so that refrigerant vapor can pass from the evaporator to the absorber. The absorbent fluid has an affinity for refrigerant vapor and absorbs refrigerant vapor that has passed from the evaporator to the absorber. This absorption produces a pressure drop which helps to maintain the pressure difference between the high and low pressure sides of the system, and it also produces a slightly lower pressure in the absorber than in the evaporator. The pressure difference between the absorber and the evaporator allows more refrigerant vapor to pass from the evaporator to the absorber which permits more refrigerant fluid in the evaporator to evaporate. The refrigerant that remains in the evaporator is thus cooled by evaporation. To take advantage of this refrigeration effect, a heat exchanging coil is positioned in the evaporator and connected to a refrigeration load as part of a closed loop fluid circuit. A heat transfer fluid is circulated through the circuit. The refrigerant in the evaporator absorbs heat from this fluid as the fluid passes through the heat exchanging coil positioned in the evaporator. The fluid, then, absorbs heat from the refrigeration load.

As the absorbent fluid absorbs refrigerant vapor, it becomes diluted by the refrigerant and its affinity for refrigerant vapor decreases. In order to separate the absorbed refrigerant from the absorbing fluid and thereby obtain a concentrated absorbent fluid, the diluted solution of refrigerant and absorbent fluid is pumped from the absorber to the generator. A heat exchanger is positioned in the generator and a heated fluid such as steam or hot water is circulated through the heat exchanger. Conventionally, the liquid, dilute solution is collected in the generator so that the solution floods the heat exchanger. Heat is transferred from the heat exchanger to the solution and this heat vaporizes, or "boils off," refrigerant that had been absorbed by the absorbent fluid. The absorbent fluid is, thus, concentrated and the concentrated absorbent fluid then flows from the high pressure generator back to the low pressure absorber. The refrigerant vapor that was evaporated from the solution passes to the condenser where it is condensed by a cooling liquid flowing through a heat exchanger located in the condenser. This cooling liquid maintains the condenser at a slightly lower temperature than the generator. This results in the pressure in the condenser being slightly lower than the pressure in the generator. Due to this fact, the refrigerant vapor flows naturally from the generator to the condenser. After being condensed, the refrigerant flows from the high pressure condenser to the low pressure evaporator where a new cycle can begin.

The heat needed to vaporize refrigerant from the dilute solution of refrigerant fluid and absorbent fluid; that is, to generate a concentrated absorbent fluid, can be provided by any suitable energy source such as an oil-fired steam generator. In absorption refrigeration systems that use this or other traditional sources of heat, the fluid that is passed through the heat exchanger in the generator is raised to about 250° F. before entering the heat exchanger. Recently, much attention has been directed toward using low temperature energy sources to generate a concentrated absorbent fluid. For example, consideration has been given to solar energy, geothermal energy, and the waste heat produced by many manufacturing processes. These low energy sources usually cannot provide a working fluid that has a temperature greater than 200° F. and often the fluid has a temperature of only 170° F. or 180° F.

It has been learned that, in an absorption refrigeration system which utilizes a low temperature energy source, better results can be obtained if the dilute solution, instead of being collected in the generator and flooding the heat exchanger therein, is sprayed over and through the heat exchanger of the generator. Heat is transferred from the individual heat exchange tubes of the heat exchanger to the solution, and refrigerant evaporates and is separated from the solution. As the solution flows down through the heat exchanger, heat is continuously transferred to the solution and the amount of refrigerant that evaporates from the solution increases. That is, only a small amount of refrigerant may be evaporated from the dilute solution near the top of the heat exchanger, but a relatively large amount of refrigerant may be boiled off from the solution in the lower portion of the heat exchanger.

With prior art spray generators, various factors adversely affect the rate of heat transfer from the heat exchange tubes to the solution flowing over the tubes. For example, there may be poor liquid distribution throughout the heat exchanger. Ideally, there should be a uniform liquid flow rate per unit area of heat exchange tube surface throughout the entire heat exchanger. Typically, in prior art spray generators, the liquid flow rate per unit area of heat exchange tube surface has varied through the heat exchanger, being somewhat higher near the top and slightly lower near the bottom. One reason for this difference, among others, is that the liquid volume decreases as the solution flows through the heat exchanger due to the fact that refrigerant is being separated from the liquid solution and evaporated.

This liquid distribution problem is exacerbated by the refrigerant vapor that is evaporated from the solution in the heat exchanger. When the refrigerant becomes a vapor, it tends to leave the downward liquid flow path and flow directly out of the heat exchanger toward the lower pressure condenser. The heat exchange tubes of the heat exchanger often interfere with this tendency by blocking the vapor inside the heat exchanger. Inside the heat exchanger, the refrigerant vapor tends to force the liquid solution of absorbent and refrigerant fluid away from the surfaces of the heat exchange tubes and to cover the tubes with a vapor film. This "blow-off" factor hinders the transfer of heat from the heat exchange tubes to the solution, and it may become a severe problem near the bottom of the heat exchanger where there may be a significant amount of refrigerant vapor. In accordance with the present invention, it has been found that by varying the spacing between the heat exchange tubes of the heat exchanger in the generator so that the tubes are closely spaced near the top of the heat exchanger and more widely spaced near the bottom of the heat exchanger, vapor "blow-off" can be eliminated, liquid distribution can be improved, and the performance of the spray generator is greatly improved.

Heat exchangers having variably spaced tubes are disclosed in U.S. Pat. No. 3,316,727, and for this reason this patent appears to be the prior art which is most relevant to the present invention. This patent shows a heat exchanger comprised of a multiplicity of variably spaced heat exchange tubes in the absorber and evaporator of an absorption refrigeration system, but does not suggest using such a heat exchanger in the generator of the system. In fact, the above-named patent does not use any type of heat exchanger having a heated fluid flow therethrough to generate a concentrated solution. Instead, a plurality of fire tubes are utilized to separate refrigerant from the dilute solution. Thus, the system disclosed in the U.S. Pat. No. 3,516,727 is not able to take advantage of a relatively low cost energy source such as solar energy to generate a concentrated solution. The present invention, as discussed in greater detail below, is able to so utilize such an energy source. Accordingly, it is felt that the invention disclosed herein is patentably distinguished from the above-mentioned reference patent.

Furthermore, the solution flowing through the heat exchanger in the generator of the present invention flows in the direction in which the tube spacing increases. On the other hand, the U.S. Pat. No. 3,316,727 shows solution flowing through the variably spaced heat exchange tubes in the direction in which the tube spacing decreases—exactly the opposite of the present invention. Thus, the arrangement disclosed in the above-identified patent would be ineffectual in solving the problems such as vapor "blow-off" and poor liquid distribution in the spray generator of an absorption refrigeration system, which are substantially resolved by the present invention. This further supports the patentability of the present invention.

Moreover, the present invention includes a baffle covering the top, closely spaced heat exchange tubes to prevent liquid solution from splashing out of the heat exchanger off of the top tubes. While the U.S. Pat. No. 3,316,727 discloses a baffle, its purpose is simply, referring to line 75 of column 4 and lines 1 and 2 of column 5 of the above-named patent, to direct fluid from the spray nozzles positioned above the heat exchanger onto the individual tubes of the heat exchanger. The baffle disclosed in the U.S. Pat. No. 3,316,727 is not capable of preventing the fluid loss which the baffle of the present invention can prevent; that is, the fluid loss due to solution splashing off of the top tubes. For this reason and the other reasons advanced above, as well as for the reasons discussed below, it is felt that the present invention patentably distinguishes U.S. Pat. No. 3,316,727.

SUMMARY OF THE INVENTION

In view of the above, an object of the present invention is to improve absorption refrigeration systems.

A further object of this invention is to improve generators for absorption refrigeration systems.

Another object of the present invention is to provide an absorption refrigeration system with a spray generator having improved liquid distribution.

A still further object of this invention is to minimize the "blow-off" problem in spray generators of absorption refrigeration systems.

These and other objects are attained in an absorption refrigeration system having a generator that includes a heat exchanger comprised of a multiplicity of variably spaced heat exchange tubes. The tubes are closely spaced near the top of the heat exchanger and more widely spaced near the bottom of the heat exchanger. In a preferred embodiment, the tubes are arranged in generally parallel rows and the distance between successive rows increases in a downward direction. Also, the distance between adjacent tubes in a row, uniform for each row, increases with each successive downward row. The heat exchanger is positioned in the generator so that the dilute solution from the absorber is sprayed over the heat exchanger and flows down through the heat exchanger. The closely spaced top tubes are covered by a baffle to prevent the liquid solution from splashing out of the heat exchanger off of these tubes. The close nesting of the tubes in the upper part of the heat exchanger retards liquid flow and aids sensible heating of the solution. Spacing the tubes wider at the bottom helps to maintain a constant liquid flow rate per unit area of tube surface throughout the heat exchanger by decreasing tube surface area in that portion of the heat exchanger where the liquid flow rate tends to be increasing. The wider spaced tubes also eliminates vapor blow-off, by facilitating the flow of refrigerant vapor out of the heat exchanger.

Further benefits and advantages of the invention will become apparent from a consideration of the following description given with reference to the accompanying drawings which specify and show a preferred embodiment of the invention.

A DETAILED DESCRIPTION OF A PREFERRED EMBODIMENT

For the purpose of this specification, it will be assumed that the absorption refrigeration system described herein is of the type which employs a hygroscopic brine as the absorbent and water as the refrigerant. Inasmuch as lithium bromide solution has been found to be a suitable absorber medium, reference will sometimes be made to the system employing this salt as the absorbent, but it should be understood that the invention has general application to absorption refrigeration systems using any of several other known absorbent-refrigerant combinations.

Similarly, a preferred embodiment of the present invention is arranged for utilizing a low temperature energy source, and in particular solar energy, to regenerate a concentrated absorbent solution. It should be clear, though, that any of many well known energy sources, both low temperature and high temperature, such as a conventional steam boiler, the normally uncovered heat energy produced by many manufacturing processes, or geothermal sources can likewise be employed in the practice of the present invention. Also, the term "concentrated solution" as used herein means a solution of relatively higher concentration in lithium bromide, while the term "dilute solution" means a solution relatively lower in concentration of lithium bromide.

Figure 1:
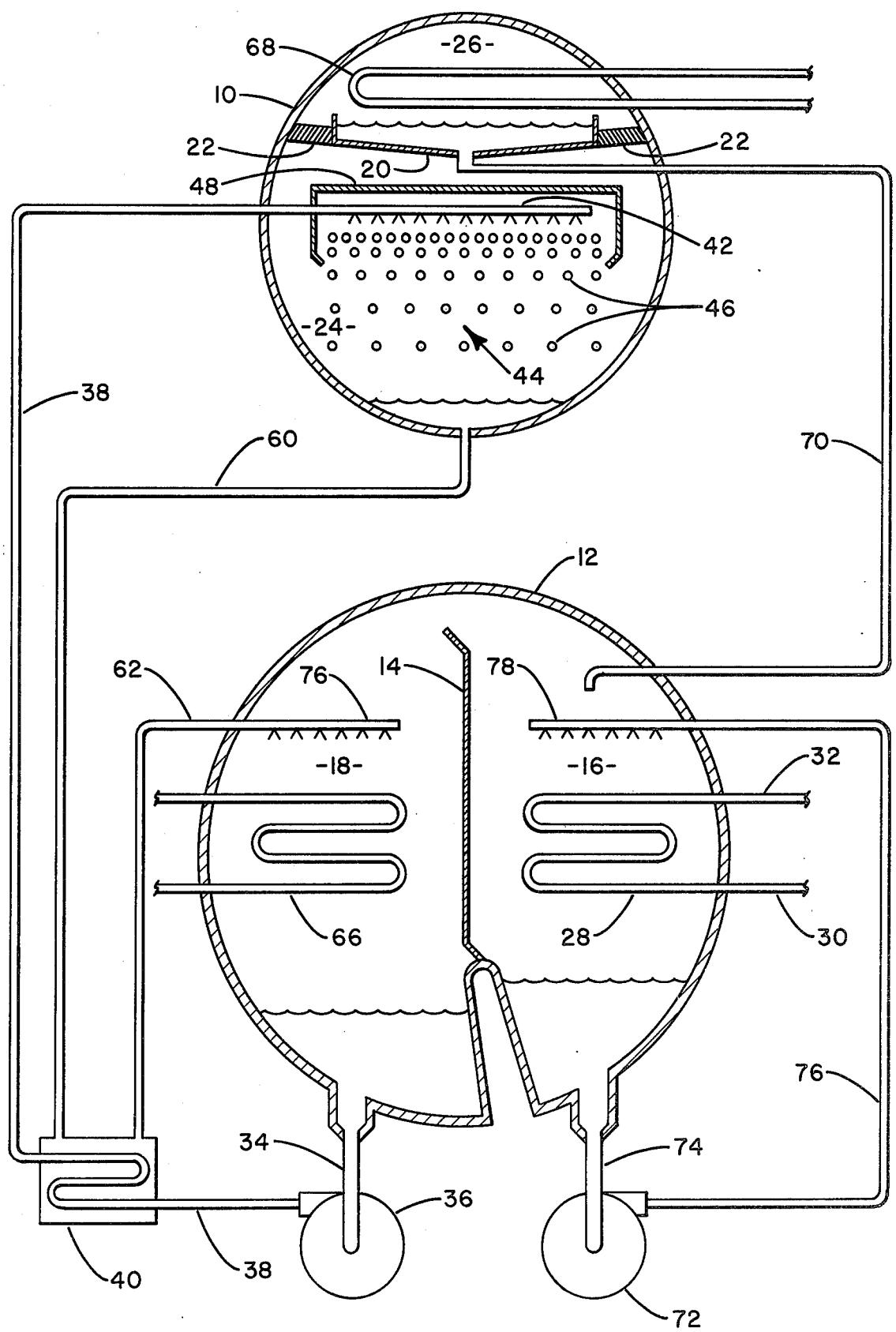
FIG. 1 is a schematic representation of an absorption refrigeration system having a generator constructed according to the present invention.

Referring now to the drawings, FIG. 1 is a schematic representation of an absorption refrigeration system having a generator that is constructed according to the present invention. The system comprises, generally, a high pressure upper shell 10 and a low pressure lower shell 12. As is conventional in absorption refrigeration machines, the lower shell 12 is divided into two sections by a partition 14. The sections include an evaporator section 16 and an absorber section 18. Also, the upper shell 10 is separated by a pan 20 and liquid eliminators 22 into a generator section 24 and a condenser section 26.

Under normal operating conditions, a refrigerant such as water is located in the evaporator 16 and refrigerant vapor passes from the evaporator to the absorber 18 where an absorbent fluid such as lithium bromide absorbs the vapor. This produces a pressure drop in the absorber 18 which allows more vapor to pass from the evaporator 16 to the absorber. This causes more refrigerant to evaporate in the evaporator 16 which produces a refrigeration effect in the evaporator. To take advantage of this refrigeration effect, water, or some other suitable heat exchanging medium, is passed through a heat exchanging coil 28 located in the evaporator 16. The heat exchanging coil 28, commonly referred to as the chilled water coil, is connected by water lines 30 and 32 to a refrigeration load. The evaporating refrigerant in the evaporator 16 absorbs heat from the water as the water passes through the chilled water coil 28 and this allows the water, in turn, to absorb heat from the refrigeration load. Typically, the water enters the chilled water coil 28 at approximately 54° F. and leaves at approximately 44° F.

As the absorbent fluid absorbs refrigerant vapor, the fluid becomes diluted and its ability to absorb more refrigerant vapor decreases. In order to generate a concentrated absorbent fluid, the relatively dilute solution of absorbent fluid and refrigerant fluid is drawn from the absorber 18 through fluid line 34 by pump 36. The pump 36 directs the solution through line 38, through heat exchanger 40, to be discussed below, and to a spray header 42 which is positioned near the top of the generator 24. The spray header 42 then sprays the dilute solution over a heat exchanger 44 which is comprised of a bundle of heat exchange tubes 46.

The heat exchanger 44 is operatively connected to a solar heat collector (not shown) so that hot water or steam can flow through the heat exchange tubes 46 and transfer heat to the solution. The heat exchange tubes 46 are spaced close together near the top of the heat exchanger 44. This slows the flow of the liquid solution through the upper portion of the heat exchanger 44 and increases the heat transfer surface area in that portion of the heat exchanger. This decreases the liquid flow rate per unit of heat transfer surface area in the top part of the heat exchanger and aids sensible heating of the solution. As the solution flows down through the heat exchanger 44, heat is transferred to the solution from the surfaces of the heat exchange tubes 46. The dilute solution is heated and refrigerant begins to evaporate from the solution. The evaporated refrigerant has an inclination to flow out of the sides of the heat exchanger 44 towards the condenser 26 where the vapor pressure in slightly lower.

As the liquid solution continues to flow down through the heat exchanger 44 and absorb heat, more and more refrigerant evaporates from the solution. By the time the solution reaches the bottom section of the heat exchanger 44, a relatively large amount of refrigerant is evaporating from the solution. In order to facilitate the flow of this refrigerant vapor toward the condenser 26, the heat exchange tubes 46 are widely spaced apart in the lower portion of the heat exchanger 44. Thus, instead of being blocked inside the heat exchanger 44 by the tubes 46, the refrigerant vapor has a good opportunity to flow out of the heat exchanger. Facilitating this flow of refrigerant vapor prevents the vapor from remaining inside the heat exchanger 44 where it would force liquid solution away from the surfaces of the heat exchange tubes 46 and cover the tubes with a film of vapor. The liquid solution can come into direct contact with the surfaces of the individual heat exchange tubes 46. This maximizes the amount of heat transferred to the dilute solution and the amount of refrigerant evaporated from that solution. Spacing the tubes 46 wider apart at the bottom of the heat exchanger 44 also decreases the heat transfer surface area in that section of the heat exchanger, and this increases the liquid flow rate per unit area of heat transfer surface in the lower part of the heat exchanger. Thus, by varying the spacing of the heat exchange tubes 46 in the manner described above, the tendency to develop a larger liquid flow rate per unit area of heat transfer surface in the upper section of the heat exchanger and a smaller rate in the lower section is counteracted. Also, the liquid blow-off problem of conventional spray generators is eliminated.

The generator 24 also includes a baffle 48. In a preferred embodiment, the baffle 48 extends across the top of the heat exchanger 44 and down the sides thereof approximately one-third the depth of the heat exchanger. The baffle 48 prevents liquid solution from splashing out of the heat exchanger 44 off of the top, closely spaced heat exchange tubes 46.

The concentrated solution, after flowing through the heat exchanger 44, flows to the bottom of the generator 24. From the high pressure generator 24 the solution flows through fluid line 60 and through the heat exchanger 40. The heat exchanger 40 is used to increase the efficiency of the system by transferring heat from the relatively warm solution coming from the generator 24 to the relatively cool solution coming from the absorber 18. This has the effect of preheating the dilute absorbent solution before it enters the generator 24 and precooling the concentrated absorbent solution before it enters the absorber 18. After passing through the heat exchanger 40, the absorbent solution flows through fluid line 62 to spray header 64 which is positioned in the low pressure absorber 18. In the absorber 18, the concentrated solution is sprayed over a heat exchanger 66. Heat exchanger 66 is connected to a source (not shown) of relatively cool water such as a cooling tower of any conventional design. The cooled, concentrated absorbent solution in the absorber 18 can absorb refrigerant vapor thereby continuing the production of the refrigeration effect in the evaporator 16.

Refrigerant evaporated in the generator 24 from the absorbent solution passes through liquid eliminators 22 to the condenser 26 where it is cooled and condensed by cooling water flowing through heat exchanger 68. The cooling water flowing through heat exchanger 68 causes the condenser to be at a slightly lower temperature than the generator 24. This temperature differential results in a slightly lower pressure in the condenser 26 which accounts for the tendency of the refrigerant vapor to flow from the heat exchanger 44 in the generator 24 to the condenser. The source of the cooling water for heat exchanger 68 may be the same source as for the heat exchanger 66 located in the absorber 18. As absorption refrigeration systems are commonly constructed, these two heat exchangers may be connected in series. Condensed refrigerant flows to the bottom of the condenser 26 and collects in the pan 20. The refrigerant then flows from the high pressure condenser 26 through fluid line 70 to the low pressure evaporator 16. A refrigerant pump 72 is connected to the evaporator 16 by line 74 to recirculate through the evaporator refrigerant that has collected in the bottom of the evaporator. The pump 72 draws refrigerant from the bottom of the evaporator 16 through line 74 and then discharges it through fluid line 76 to a spray header 78 which is located in the evaporator above the chilled water coil 28.

Figure 2:
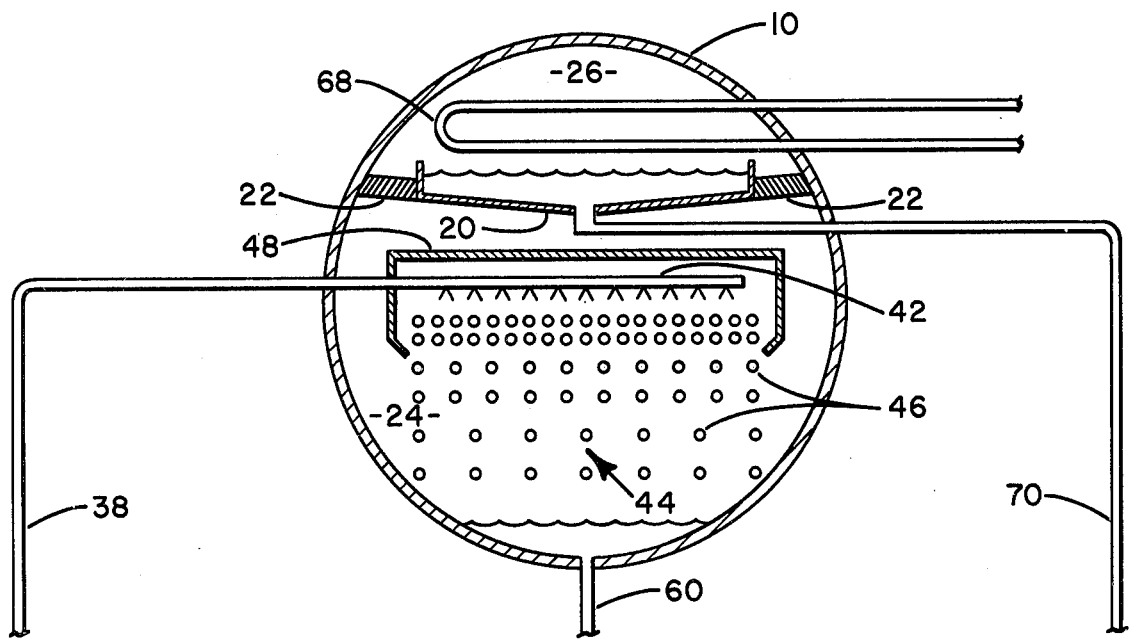
FIG. 2 is a schematic representation of the generator and condenser of the system shown in FIG. 1 with the generator constructed according to an alternate embodiment of the present invention.

In a preferred embodiment of the present invention, as illustrated in FIG. 1, the heat exchange tubes 46 are arranged in a plurality of generally parallel rows and the distance between successive rows increases in the downward direction as viewed in FIG. 1. In addition, the distance between adjacent tubes in a row is uniform for each row, but varies from row to row increasing in the downward direction. It should be understood that this particular spacial arrangement is not necessary to the present invention. other geometric configurations will be apparent to one skilled in the art. For example, as illustrated in FIG. 2, the tubes could be arranged in sets, a top set, a middle set, and a bottom set, with the tube spacing uniform for each set but varying between sets so that the tubes in the top set are closely spaced, the tubes in the bottom sets are widely spaced, and the tubes in the middle set have an intermediate spacing.

While it is apparent that the invention herein disclosed is well calculated to fulfill the objects above stated, it will be appreciated that numerous modifications and embodiments may be devised by those skilled in the art and it is intended that the appended claims cover all such modifications and embodiments as fall within the true spirit and scope of the present invention.

What is claimed is:

1. In an absorption refrigeration system, wherein a solution of refrigerant and absorbent fluid is heated to separate refrigerant from the solution leaving concentrated absorbent fluid, a generator for heating the solution, including,
a spray nozzle to spray the solution of refrigerant and absorbent fluid downward,
a heat exchanger positioned below the spray nozzle and comprised of a bundle of substantially parallel, generally horizontal heat exchange tubes, wherein the tubes are closely spaced in the top portion of the heat exchanger to retard the flow of solution therethrough and aid sensible heating of the solution, and wherein the tubes are widely spaced in the lower portion of the heat exchanger to facilitate the flow of refrigerant, which has been separated from the solution, out of the heat exchanger,
a baffle covering the top of the heat exchanger to prevent solution from splashing off the heat exchange tubes and out of the heat exchanger, and
means to pass a relatively warm fluid through each heat exchange tube for transmitting heat to the solution to separate refrigerant from the solution.

2. The generator of claim 1 wherein the bundle of heat exchange tubes are arranged in generally parallel rows and wherein,
the spacing between rows increases downwardly through the bundle, and
the spacing between tubes in a row increases downwardly through the bundle.

3. The generator of claim 1 wherein the bundle of heat exchange tubes includes,
a first set of narrowly spaced heat exchange tubes, and
a second set of broadly spaced heat exchange tubes.

4. The generator of claim 1 wherein the baffle covers approximately the top one-third of the heat exchanger.

5. In a spray generator of an absorption refrigeration system wherein a liquid solution of refrigerant fluid and absorbent fluid is sprayed over a heat exchanger comprised of a multiplicity of substantially parallel, generally horizontal heat exchange tubes, a relatively warm fluid passes through the heat exchange tubes, heat is transmitted to the solution through the heat exchange tubes to drive off refrigerant vapor, leaving a concentrated absorbent fluid, and refrigerant vapor flows out of the heat exchanger toward the condenser of the system, the improvement comprising,
spacing the heat exchange tubes closer together near the top of the heat exchanger to retard the flow of the liquid solution therethrough and aid sensible heating of the solution,
spacing the heat exchange tubes further apart near the bottom of the heat exchanger to facilitate the flow of refrigerant vapor out of the heat exchanger, and
a baffle covering the top of the heat exchanger so that the liquid solution does not splash off the top heat exchange tubes and out of the heat exchanger.

6. An absorption refrigeration machine comprising a generator section for heating a dilute solution of refrigerant and absorbent fluid, a condenser section, an evaporator section, and an absorber section connected to provide refrigeration, wherein the generator section includes,
a tube bundle disposed within a shell and comprising a plurality of horizontally extending heat exchange tubes connected to provide a passageway for a relatively warm fluid,
means to discharge the dilute solution of refrigerant and absorbent fluid over the top of the tube bundle so that the solution flows downward through the bundle and heat is transmitted to the solution from the fluid passing through the heat exchange tubes to separate refrigerant from the solution, leaving concentrated absorbent fluid,
wherein the heat exchange tubes of the tube bundle are closely spaced near the top of the bundle to retard the flow of solution therethrough and aid sensible heating of the solution, and the heat exchange tubes are more widely spaced near the bottom of the bundle to facilitate the flow of refrigerant, which has been separated from the solution, out of the bundle, and
a baffle to cover the top of the tube bundle for preventing solution from splashing out of the bundle off of the top, closely spaced heat exchange tubes.

7. The absorption refrigeration machine of claim 6 wherein the bundle of heat exchange tubes are arranged in a plurality of generally parallel rows, and the vertical distance between adjacent rows increases in the downward direction, and the horizontal distance between adjacent tubes increases in the downward direction.

8. The absorption refrigeration machine of claim 6 wherein the bundle of heat exchange tubes includes, a first set of evenly spaced, narrowly spaced heat exchange tubes positioned near the top of the bundle, and a second set of evenly spaced, broadly spaced heat exchange tubes positioned near the bottom of the bundle.

* * * * *

UNITED STATES PATENT AND TRADEMARK OFFICE
CERTIFICATE OF CORRECTION

PATENT NO. : 4,158,295
DATED : June 19, 1979
INVENTOR(S) : HOWARD W. SIBLEY

It is certified that error appears in the above-identified patent and that said Letters Patent are hereby corrected as shown below:

Column 3, Line 22 should read: - disclosed in the U.S. Pat. No. -- 3,316,727 is not able to --.

Column 6, Line 1 should read: - towards the condenser 26 where the vapor pressure -- is -- -.

Signed and Sealed this

Eighth Day of January 1980

[SEAL]

Attest:

Attesting Officer

SIDNEY A. DIAMOND

Commissioner of Patents and Trademarks